United States Patent
Lai

(10) Patent No.: US 7,042,969 B2
(45) Date of Patent: May 9, 2006

(54) METHOD AND APPARATUS FOR FRAME ALIGNMENT IN DISCRETE MULTITONE TRANSCEIVERS

(75) Inventor: Yhean-Sen Lai, Somerset, NJ (US)

(73) Assignee: Agere Systems Inc., Allentown, PA (US)

( * ) Notice: Subject to any disclaimer, the term of this patent is extended or adjusted under 35 U.S.C. 154(b) by 758 days.

(21) Appl. No.: 10/047,177

(22) Filed: Jan. 15, 2002

(65) Prior Publication Data

US 2003/0133525 A1  Jul. 17, 2003

(51) Int. Cl.
*H03D 1/06* (2006.01)
*H03D 11/04* (2006.01)
*H03K 5/01* (2006.01)
*H03K 6/04* (2006.01)
*H04L 25/08* (2006.01)

(52) U.S. Cl. .............. 375/348; 375/285; 375/316; 375/346; 327/310; 327/384; 327/551; 348/607; 455/296

(58) Field of Classification Search ............ 375/229, 375/232, 290, 348; 455/296
See application file for complete search history.

(56) References Cited

U.S. PATENT DOCUMENTS

| 5,680,451 A | * | 10/1997 | Betts et al. ............ 379/406.09 |
| 5,909,332 A | * | 6/1999 | Spurbeck et al. ............ 360/51 |
| 6,404,831 B1 | * | 6/2002 | Melas ................ 375/350 |
| 2003/0016770 A1 | * | 1/2003 | Trans et al. ............. 375/346 |
| 2003/0099313 A1 | * | 5/2003 | Li et al. ................ 375/343 |

\* cited by examiner

*Primary Examiner*—Stephen Chin
*Assistant Examiner*—Erin M. File
(74) *Attorney, Agent, or Firm*—Synnestvedt Lechner & Woodbridge LLP

(57) ABSTRACT

A method and apparatus for determining frame alignment in a discrete multitone transceiver by determining a rotation of the coefficients of the shortening channel impulse response for which inter symbol interference (ISI) is minimal. The ISI is determined by multiplying the average value of a transmitted discrete multitone symbol and multiplying it by the coefficients of the shortening channel impulse response in a given rotation.

21 Claims, 4 Drawing Sheets

US 7,042,969 B2

METHOD AND APPARATUS FOR FRAME ALIGNMENT IN DISCRETE MULTITONE TRANSCEIVERS

FIELD OF INVENTION

The invention pertains to transceivers and modems. More particularly, the invention pertains to asymmetric digital subscriber line (ADSL) modems used to achieve very high speed data communication via telephone networks.

BACKGROUND OF THE INVENTION

There is an ever present desire to maximize the speed of digital communications via networks, and particularly telecommunication networks, such as public telephone systems. Accordingly, telecommunication network providers now offer customers many options for coupling to the telephone network in addition to the standard analog based connection commonly referred to as POTS (Plain Old Telephone System). Some of the options that are widely available are Integrated Services Digital Network (ISDN) lines, T-1 lines, E-1 lines, digital subscriber lines (DSL) and asymmetric digital subscriber lines (ADSL).

ADSL's can provide very high data speeds, such as on the order of several megabits per second, over a standard twisted wire pair. Unlike the traditional data modems used for analog communication with a telephone central office via a twisted wire pair, ADSL requires modems both at the subscriber end and at the telephone company Central Office end. Current ADSL systems employ discrete multitone (DMT) technology to implement high bandwidth communications, such as for digital TV broadcast, on demand video, high speed video-based internet access, work at home digital file transfer, teleconferencing, home shopping, and other information services over existing twisted wire pair telephone lines.

Several DMT standards have been promulgated. For instance, the International Telecommunications Union (ITU) has promulgated a standard for ADSL that is commonly termed G.lite and which is set forth in ITU-T specification G.992.2, incorporated herein by reference. Another standard, promulgated by ANSI, is commonly termed Heavy ADSL and is set forth in ANSI specification T1.413, issue 2, also incorporated herein by reference. In DMT communications, data is sent in frames. A frame is comprised of a plurality of samples, each frame including data samples and cyclic prefix samples. Data samples comprise most of the frame and the collection of data samples in a single frame comprise one DMT symbol. The cyclic prefix is added at the beginning of each frame and comprises the last L samples of that frame. Accordingly, the cyclic prefix samples are between the DMT symbols in the data stream. The purpose of the cyclic prefix is to help avoid inter-symbol interference (ISI). The frame and cyclic prefix is of a standardized length. For example, in heavy ADSL, each symbol comprises 512 samples with 256 tones (32 tones for upstream communications), each tone having a real and an imaginary portion. Heavy ADSL utilizes a cyclic prefix of length L=32 samples. Accordingly, a frame has 544 samples.

FIG. 1 is a block diagram of the basic ADSL modem functions, as would be well known to those of skill in the art. The upper half of the diagram represents functions in the transmit direction while the lower half represents functions in the receive direction.

It should be noted that FIG. 1 is a functional block diagram and that the blocks shown therein do not necessarily correspond to separate physical circuits. In fact, most if not all of the functions will be performed by one or more digital processors such as, but not limited to, a digital signal processor, a micro processor, a programmed general purpose computer, etc. It also is possible that part or all of the functions of some of the blocks may be implemented by analog circuitry.

In the transmit direction, digital data is transmitted from the transmitter 102 to a scrambler 104 that scrambles the data for transmission. The data is then processed through a forward error correction (FEC) encoder 106 which adds syndrome bytes to the data. The syndrome bytes will be used for error correction by the receiver at the receiving terminal. Next, as shown in block 108, the transmit data is encoded using quadrature amplitude modulation (QAM). The data is then converted from the frequency domain to the time domain via Inverse Fast Fourier Transform (IFFT) 110.

A 1:4 interpolator 112 interpolates the output of IFFT block 110 to produce 512 samples from the 128 samples output from block 110. The 32 sample cyclic prefix is added to each frame in block 114. The data is then forwarded to a coder/decoder (CODEC) 116. The CODEC encodes the data for transmission over the twisted wire pair to the receiving device.

In the receiver portion of transceiver 100, the received signal is passed from the twisted wire pair through the CODEC 116 where it is decoded. It is then passed to a time domain equalizer (TEQ) 118 to shorten the channel impulse response. Then, in 120, the cyclic prefix is removed. It will be appreciated by those of skill in the related arts that, if the length of the channel impulse response is less than or equal to the cyclic prefix length, then the Inter-Symbol Interference (ISI) can be eliminated by removing the Cyclic Prefix (CP) length. Furthermore it is possible to compensate for channel distortion with the frequency domain equalization (FEQ) in block 124, discussed further below.

An echo canceller (EC) 134 is coupled between the transmit path and the receive path and creates an echo cancellation signal based on the transmit signal which is subtracted by subtractor 121 from the receive signal in order to cancel any echo of the transmit signal that is present on the twisted wire pair that could interfere with the received signal. The residual echo signal is converted back to the frequency domain by fast fourier transform (FFT) in block 122.

The received signal, which now has had the cyclic prefix removed and has been converted back to the frequency domain is sent to block 124, where frequency domain equalization (FEQ) is employed to compensate for the channel distortion.

The received signal is then processed through a quadrature amplitude modulation (QAM) decoder 126 to decode the tone signal into digital data. That is followed by forward error correction (FEC) in block 128 which uses the syndrome bits that were added by the transmit path FEC encoder 106 to perform forward error correction. Finally, the data is descrambled in block 130 to extract the true data signal and then forwarded to a receiver 132.

The output of the FFT block 122 also is sent to a timing recovery circuit 136 that controls the CODEC 116 to synchronize the CODEC to the timing of the received data. Essentially, the timing recovery process is a feedback process in which the timing tones are detected and used to continuously adjust the CODEC timing so as to sample the received data at the appropriate sampling points.

In prior art frame alignment schemes, during initialization, the transmitter transmits a known pattern in a frame and the receiver attempts to receive that pattern. More particularly, the transmitter transmits the same pattern in a Who plurality of frames, for example 1024 consecutive frames. The receiver performs a cross-correlation of the data on the two wire pair with the expected pattern while the transmitter transmits those 1024 frames and determines which set of L+1 consecutive samples yields the peak cross correlation. The timing that resulted in the peak cross correlation calculation is selected as the start time of a frame or a symbol. It means that the sample that resulted in the peak cross correlation calculation is the first sample of the frame, e.g., 544 samples (before removing the cyclic prefix).

This technique for frame alignment or symbol alignment is computationally demanding and is not as accurate as desired.

Accordingly, it is an object of the present invention to provide an improved method and apparatus for frame alignment in a DMT transceiver.

It is another object of the present invention to provide an improved DMT transceiver.

SUMMARY OF THE INVENTION

The invention is a method and apparatus for aligning with a transmit frame in a discrete multitone (DMT) transceiver so as to minimize inter-symbol interference (ISI). The method and apparatus involves calculating the shortening channel impulse response and then determining the particular set of consecutive samples of length L+1 in the shortening channel impulse response, that has a maximal energy. Once this particular set of coefficient is determined, the first coefficient of that set is selected as a starting location $h'_0$ in shortening impulse response for determining frame alignment. This can be achieved by skipping samples of the receive signal in a particular frame.

The majority of the interference of the immediately preceding symbol on the present symbol typically is approximately contributed by shortening channel impulse response coefficients $h'_{L+1}, h'_{L+2}, \ldots h'_{P-1}$, where P is the DMT symbol length (e.g., 512 samples). This is true because the channel impulse response coefficients, $h'_0, h'_1, \ldots h'_L$, do not contribute to the ISI. Therefore, the majority of the interference can be calculated with the shortening channel impulse response coefficients $h'_{L+1}, h'_{L+2}, \text{---} \text{ and } h'_{P-1}$.

The noise on the i-th subcarrier is a complex value $r_i + s_i j$, where $j = \sqrt{-1}$, and the absolute value $\sqrt{r_i^2 + s_i^2}$ is considered to be the ISI noise on the i-th subcarrier. The total ISI noise is computed by summing all the inner products of the weight factor vector W and the ISI leakage energy vector from the previous symbol, $\overline{C|h'_i|F V_k}$. The rotation of the shortening channel impulse response, that yields the smallest total ISI noise will be chosen as the frame alignment point.

Accordingly, to determine the best rotation of the shortening channel impulse response coefficients for frame alignment, we calculate the ISI using the rotation as described above as well as several immediately surrounding rotations of the coefficients and select the rotation that yields the lowest ISI value. The calculations are performed in the frequency domain. Specifically, we multiply the average energy of the transmitted symbol (which is a constant) by the Fast Fourier Transform (FFT) of the ISI value caused by the imperfect shortening channel impulse response coefficients. We do this for various rotations including and immediately surrounding the rotation determined above and take the rotation that yields the smallest value. It has been found that excellent results can be achieved by calculating the interference value for a relatively small number of rotations. For instance, in a DMT system with 512 samples per symbol and a 32 sample cyclic prefix, excellent results can be achieved by calculating interference for about seven different rotations surrounding and including the rotation corresponding to the maximum channel response.

DETAILED DESCRIPTION OF THE INVENTION

Figure 2:
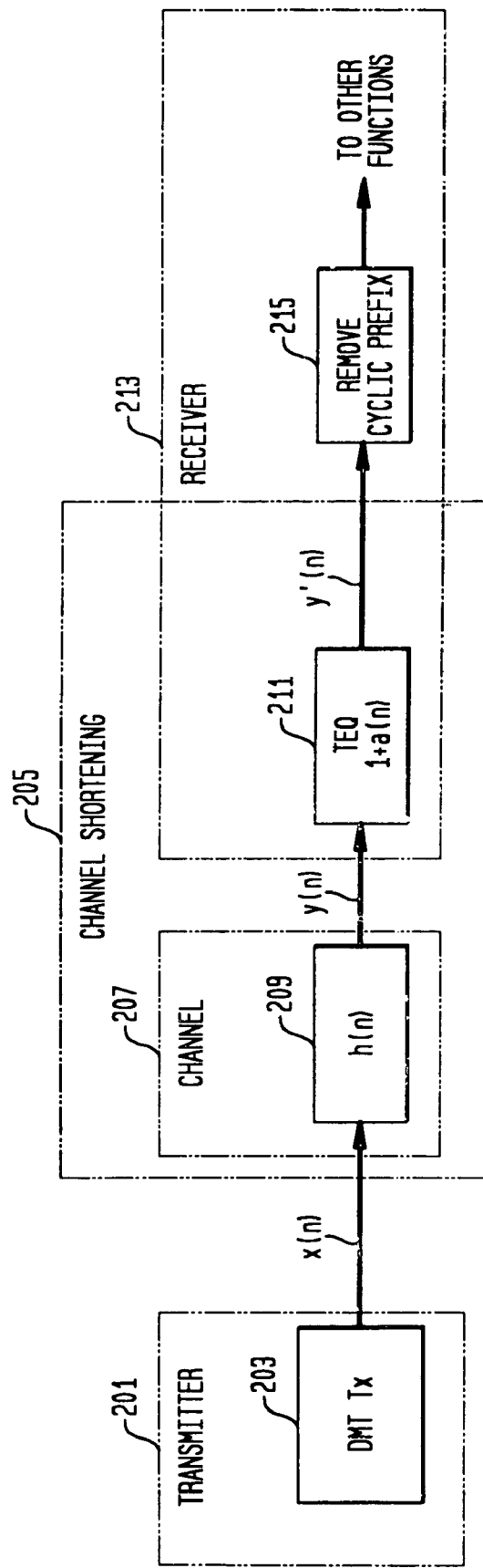
FIG. 2 is a block diagram illustrating in more detail channel shortening in discrete multitone communications in accordance with the prior art.

FIG. 2 is a block diagram that helps illustrate time domain equalization in DMT in more detail. In particular, block 203 encompasses functions performed at the transmitter. Block 207 encompasses functions that occur in the data channel and block 213 encompasses functions performed at the receiver. Block 205 encompasses those functions which result in channel shortening. Thus, it can be seen that, in the transmitter 203, a DMT signal, x(n), is generated for transmission via the channel. The channel 207 has a channel impulse response, h(n), represented by block 209. Accordingly, the signal, y(n), received at the receiver 213 is the convolution of the original transmitted signal x(n) and the channel response h(n), i.e.;

$$y(n) = x(n) * h(n) \qquad \text{Eq. (1)}$$

The time domain equalization circuit (TEQ) 211 in the receiver 213 is a short time-domain finite impulse response (FIR) filter that convolves the received signal, y(n), with a coefficient 1+a(n). The output y'(n) from the time domain equalization domain circuit 211 therefore is:

$$y'(n) = y(n)*(1+a(n)) = x(n)*(h(n)*(1+a(n))) = x(n)*h'(n) \qquad \text{Eq. (2)}$$

Let us call h(n)*(1+a(n)) the shortening channel impulse response (or shortening channel) and denote it as h'(n) having a length M.

The TEQ circuit 211 (i.e., Eq. (2)) shortens the channel impulse response to the length of the cyclic prefix, e.g., 32 samples. Then the cyclic prefix is removed from the signal y'(n) in block 215.

If the shortening channel length, M, is less than or equal to the length, L, of the cyclic prefix, i.e., $M \leq L$, then each y'(n) will have no dependence on any transmitted samples before x(n-L), i.e., there will be no inter-symbol interference (ISI).

Thus, after the cyclic prefix is removed, the actual symbol will remain without inter symbol interference. However, if M>L, then the sampling signal y'(n) is dependent on the samples before x(n-L) and, thus, the removal of the cyclic prefix would not prevent inter-symbol interference and thus would degrade the performance of the transceiver. Hence, it is desirable to design an efficient TEQ shortening filter, 1+a(n), that makes $M \leq L$ and for which the energy in the channel impulse response h'(n) with $0 \leq n < 512$ is as small as possible for $n \geq L$ and as large as possible for n<L.

For proper operation of the transceiver in accordance with the description above, of course, the frame in the receiver must align itself to the frame in the remote transmitter in order to read the frame samples correctly. The proper frame alignment point is determined during initialization.

U.S. patent application Ser. No. 09/481,027 entitled "Method and Apparatus for Time-Domain Equalization in Discrete Multitone Transceivers", filed on Jan. 11, 2000, describes a TEQ shortening filter that produces an overall channel response h'(n) for which $M \leq L$, as desired in order to eliminate ISI.

The impulse response h(n) of the channel has the transfer function:

$$H(z) = \frac{B(z)}{A(z)} = \frac{b_0 + b_1 z^{-1} + b_2 z^{-2} + \ldots + b_{(L-1)} z^{-(L-1)}}{1 + a_1 z^{-1} + a_2 z^{-2} + \ldots + a_{(K-1)} z^{-(K-1)}} \quad \text{Eq. (3)}$$

where L is the length of the cyclic prefix, and K is the length of the TEQ filter having impulse response (1+a(n)) or A(z). In accordance with equation (3), the transfer function of the shortening channel is:

$$\overline{h}(z) = A(z)H(z) = b_0 + b_1 z^{-1} + b_2 z^{-2} + \ldots + b_{(L-1)} z^{-(L-1)} \quad \text{Eq. (4)}$$

Thus, the length, M, of the shortening channel is set equal to the length of the cyclic prefix, L, so that ISI between two consecutive symbols can be eliminated to improve the overall performance of the transceiver by removing the cyclic prefix.

Let $$I = [b_0 \; b_1 \; b_2 \ldots b_{(L-1)} \; -a_1 \; -a_2 \ldots -a_{(K-1)}]^T = [b \; a]^T \quad \text{Eq. (5)}$$

and $$W(n) = [x(n)x(n-1)x(n-2) \ldots \\ x(n-(L-1))y(n-1)y(n-2) \ldots y(n-(K-1))]^T \quad \text{Eq. (6)}$$

where T denotes the transpose of a matrix. From equations (3) through (6), the estimated signal, $\tilde{y}(n)$, at the receiver is:

$$\tilde{y}(n) = I^T W(n) \quad \text{Eq. (7)}$$

and the error is:

$$e(n) = y(n) - \tilde{y}(n) \quad \text{Eq. (8)}$$

From the well known LMS (Least Mean Square) error algorithm, the optimal solution $I_{opt}$ is $$RI_{opt} = r \quad \text{Eq. (9)}$$

where $$R = E\{W(n)W^T(n)\} \quad \text{Eq. (10)}$$

$$r = E\{y(n)W(n)\} \quad \text{Eq. (11)}$$

E{ } in the equations above represents a generalized averaging function or an ensemble average.

Since some channel interference is caused by channel noise and impairments, it is very difficult to achieve a shortening channel impulse response that has only (L+1) continuous nonzero values and zeros in the remaining slots. Hence, accurate frame alignment can be very critical to the overall performance of DMT transceivers.

Let $[h'_0, h'_1, h'_2, \ldots h'_{511}]$ be the shortening channel impulse response. As previously mentioned, one way to locate the frame alignment roughly is by finding the series of consecutive coefficients of length L+1 (L is the channel prefix length) that yields the maximal energy. By skipping samples in the receive signal in a particular frame, we can allocate the first coefficient of the series of consecutive coefficients of length L+1 as $h'_0$, whereby the coefficients from $h'_0$ to $h'_L$ yield the maximal energy. The coefficients of the shortening channel impulse response from $h'_{L+1}$ to $h'_{P-1}$ contribute to ISI. Hence, we try to make the energy as low as possible for $h'_{L+1}$ to $h'_{P-1}$. Although there is maximal energy in $h'_0$ to $h'_L$, it is not necessarily the best choice for frame alignment. Rather, we know only that the frame alignment point is close to this point. Thus, we implement a fine-tuning algorithm in accordance with the present invention to find the best location for frame alignment.

Let $c = [c_0, c_1, c_2, \ldots c_{511}]$ and $d = [d_0, d_1, d_2, \ldots d_{511}]$ be the samples of previous symbol and current symbol, respectively, that are sent from the transmitter. Due to the addition of the 32 samples of cyclic prefix, the samples that go out through the CODEC and channel will be $[c_0, c_1, c_2, \ldots c_{511}, d_{480}, d_{481}, \ldots d_{511}, d_0, d_1, d_2, \ldots d_{511}]$. Let the corresponding samples at the receiver be $[c'_0, c'_1, c'_2, \ldots c'_{511}, d''_{480}, d''_{481}, \ldots d''_{511}, d'_0, d'_1, d'_2, \ldots d'_{511}]$. Thus, after removing the cyclic prefix, we have:

$$d'_0 = d_0 h'_0 + d_{511} h'_1 + d_{510} h'_2 + \ldots \\ + d_{480} h'_{32} + c_{511} h'_{33} + \ldots + c_{33} h'_{511} \quad (12)$$

$$d'_1 = d_1 h'_0 + d_0 h'_1 + d_{511} h'_2 + \ldots + d_{480} h'_{33} \\ + c_{511} h'_{34} + \ldots + c_{32} h'_{511} \quad (13)$$

$$d'_{511} = d_{511} h'_0 + d_{510} h'_1 + d_{509} h'_2 + \ldots + d_0 h'_{511} \quad (14)$$

From equations (12) to (14) and the imperfectly shortening channel impulse response, the previous symbol will interfere with the current symbol. The interference is $c_{511} h'_{33} + \ldots + c_{33} h'_{511}$ in $d'_0$, $c_{511} h'_{34} + \ldots + c_{32} h'_{511}$ in $d'_1$, etc. If we assume that the transmitted signal is a pseudo random and stationary signal, the major interference from the previous symbol on the current symbol is $h'_{33}, \ldots, h'_{511}$. That is:

$$INTF = \overline{C}[\,|h'_{33}| + |h'_{34}| + |h'_{35}| + \ldots + |h'_{511}|, |h'_{34}| + |h'_{35}| + \\ |h'_{36}| + \ldots + |h'_{511}|, \ldots, |h'_{511}|, \underbrace{0, \ldots, 0}_{33}] \quad (15)$$

where $\overline{C}$ is the average energy value of the transmitted symbol and INTF represents the symbol interference. Equation (15) can be rewritten as:

$$INTF = \overline{C}\Big(|h'_{33}| \,[\underbrace{1,0,0,\ldots,0}_{512}] + |h'_{34}| \\ [\underbrace{1,1,0,\ldots,0}_{512}] + |h'_{35}|\,[1,1,1,0,\ldots,0] + \ldots \\ |h'_{511}|\,[\underbrace{\underbrace{1,1,1,\ldots,1}_{479},\underbrace{0,\ldots,0}_{33}}_{512}]\Big) \quad (16)$$

In equation (16), $\overline{C}$ is a constant and can be ignored. The coefficient of the $h'_{511}$ shortening channel impulse response contributes more symbol interference that the coefficient $h'_{33}$ and the coefficients from $h'_0$ to $h'_{32}$ do not affect the symbol interference at all due to the removal of the cyclic prefix.

In accordance with the analysis above, the symbol interference of the previous symbol on the current symbol is caused by the nonzero coefficients in the shortening channel impulse response. In order to reduce the symbol interference, we rotate the shortening channel impulse response [h'$_0$, h'$_1$, h'$_2$, . . . , h'$_{511}$] such that the last 479 (512−33) coefficients of the shortening channel impulse response have less symbol interference on the next symbol.

Let us define $V_k$ as $$V_k = [\underbrace{1, 1, \ldots, 1}_{k \text{ 1s}}, \underbrace{0, \ldots}_{(512-k) \text{ 0s}}].$$

Then equation (15) and (16) can be rewritten as $$INTF = [intf_0, intf_1, \ldots, intf_{511}] \quad (17)$$
$$= \overline{C}(|h'_{33}|V_1 + |h'_{34}|V_2 + \ldots + |h'_{511}|V_{479})$$

We can determine how much effect the symbol interference has on each tone in the receiver by taking the FFT (Fast Fourier Transform) of equation (16), as follows;

$$FINTF = FFT_{512}([intf_0, intf_1, \ldots, intf_{511}]) \quad (18)$$
$$= \overline{C}(|h'_{33}|FV_1 + |h'_{34}|FV_2 + \ldots + |h'_{511}|FV_{479})$$

where $FFT_{512}(V_k) = (r_0 + s_0 j, r_1 + s_1 j, \ldots, r_{255} + s_{255} j)$ and $FV_k = [t_0, t_1, \ldots, t_{255}]$ is a 256 real value vector with $t_i = \sqrt{r_i^2 + s_i^2}$.

In ADSL, the different tones will be loaded by different numbers of bits, depending on the tone's SNR (Signal to Noise Ratio). The noise is caused by ISI and all other effects of line impairments (such as echo, noise from radio signals, etc.) A bit loading algorithm will assign a certain number of bits to each tone based on the SNR, the capacity of bit rate, and other factors. For more generality, in equation (18), the noise on each tone can be weighted by a different value, $W_0$, $W_1$, . . . , $W_{255}$. In that case, the weight factor vector W on the 256 tones would be the vector.

$$W = [W_0, W_1, \ldots, W_{255}]^T \quad (19)$$

Then the total noise, TN, caused by ISI can be expressed as $$TN = |\text{total ISI noise}| = |FINTF \cdot W| \quad (20)$$
$$= \overline{C}(|h'_{33}|(FV_1 \cdot W) + |h'_{34}|(FV_2 \cdot W) + \ldots + |h'_{511}|(FV_{479} \cdot W))$$

where

|x| denotes the absolute value of x, $FV_i$ is a vector of 256 real values, and $FV_i \cdot W$ is an inner product of $FV_i$ and W.

The weight factors $W_i$ in equation (19) could be different for each of the 256 tones, depending on the importance of the tone based on its location. For example, the weight factors for the tones from 0 to 31 can be set to zeros since they are used for transmitted signals. Also, the weight factor for the timing tone (e.g., $W_{63}$) can be set slightly higher than the weight factor of the other tones since tone 63 is an important tone because it is involved in the performance of timing recovery. If timing recovery performance is poor, it will degrade the overall performance of the system and affect all of the tones.

Equation (20) exactly describes the symbol interference by the nonzero coefficients $h'_{33}, \ldots, h'_{511}$ in the shortening channel impulse response on each tone in the receiver. Since the first 33 samples, from $h_0'$ to $h_{32}'$, in the shortening channel impulse response do not cause symbol interference, we can start to find the maximal energy of L+1 (33) consecutive coefficients of the shortening channel impulse response by rotating the shortening channel impulse response coefficients in a particular frame such that the coefficients from $h_0'$ to $h_{32}'$, have the maximal energy. After that, we employ equation (20) to fine-tune to the best rotation around this range, i.e., the rotation that yields the minimal TN value.

For instance, if we want to consider this rotation plus the three rotations to each side of this rotation (for a total of seven tested rotations), then we would perform equation (20) a total of seven times, as follows:

$$TN_1 = |FINTF_1 \cdot W| =$$
$$\overline{C}(|h'_{30}|(FV_1 \cdot W) + |h'_{31}|(FV_2 \cdot W) + |h'_{32}|$$
$$(FV_3 \cdot W) + \ldots + |h'_{507}|(FV_{478} \cdot W) + |h'_{508}|(FV_{479} \cdot W))$$

$$TN_2 = |FINTF_2 \cdot W| = \overline{C}(|h'_{31}|(FV_1 \cdot W) + |h'_{32}|$$
$$(FV_2 \cdot W) + |h'_{33}|(FV_3 \cdot W) + \ldots +$$
$$|h'_{508}|(FV_{478} \cdot W) + |h'_{509}|(FV_{479} \cdot W))$$

$$TN_3 = |FINTF_3 \cdot W| = \overline{C}(|h'_{32}|(FV_1 \cdot W) + |h'_{33}|$$
$$(FV_2 \cdot W) + |h'_{34}|(FV_3 \cdot W) + \ldots +$$
$$|h'_{509}|(FV_{478} \cdot W) + |h'_{510}|(FV_{479} \cdot W))$$

$$TN_4 = |FINTF_4 \cdot W| = \overline{C}(|h'_{33}|(FV_1 \cdot W) + |h'_{34}|$$
$$(FV_2 \cdot W) + |h'_{35}|(FV_3 \cdot W) + \ldots +$$
$$|h'_{510}|(FV_{478} \cdot W) + |h'_{511}|(FV_{479} \cdot W))$$

$$TN_5 = |FINTF_5 \cdot W| = \overline{C}(|h'_{34}|(FV_1 \cdot W) + |h'_{35}|$$
$$(FV_2 \cdot W) + |h'_{36}|(FV_3 \cdot W) + \ldots +$$
$$|h'_{511}|(FV_{478} \cdot W) + |h'_0|(FV_{479} \cdot W))$$

$$TN_6 = |FINTF_6 \cdot W| = \overline{C}(|h'_{35}|(FV_1 \cdot W) + |h'_{36}|(FV_2 \cdot W) +$$
$$|h'_{37}|(FV_3 \cdot W) + \ldots + |h'_0|(FV_{478} \cdot W) + |h'_1|(FV_{479} \cdot W))$$

$$TN_7 = |FINTF_7 \cdot W| = \overline{C}(|h'_{36}|(FV_1 \cdot W) + |h'_{37}|(FV_2 \cdot W) +$$
$$|h'_{38}|(FV_3 \cdot W) + \ldots + |h'_0|(FV_{478} \cdot W) + |h'_1|(FV_{479} \cdot W))$$

The one of these seven values for TN that has the smallest value is selected as the best rotation to use for frame alignment. For example, if $TN_4$ is the minimal ISI, then there is no need to do anything further because the original frame alignment is the best one. However, if $TN_3$ is the minimal ISI, then the receiver should skip 511 (i.e., 512−1) samples in one frame in order to rotate the shortening channel impulse response as follows:

$$h'_0 \rightarrow h'_1, h'_1 \rightarrow h'_2, \ldots, h'_{511} \rightarrow h'_0.$$

In practical implementations, the $FV_i \cdot W$ computations can be stored in tables to reduce processing time.

Figure 1:
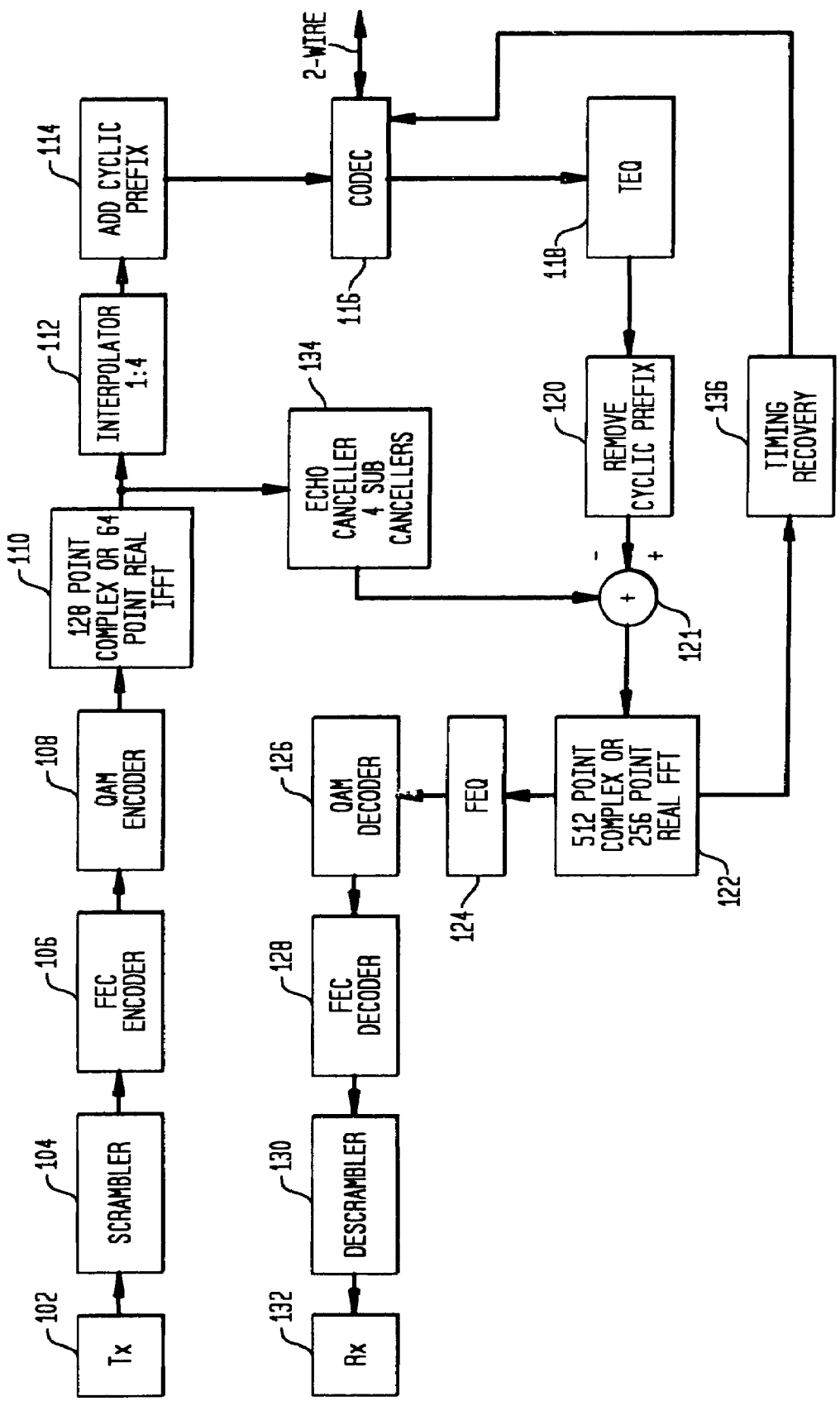
FIG. 1 is a block diagram illustrating the functions of an ADSL modem transceiver in accordance with the prior art.
Figure 3:
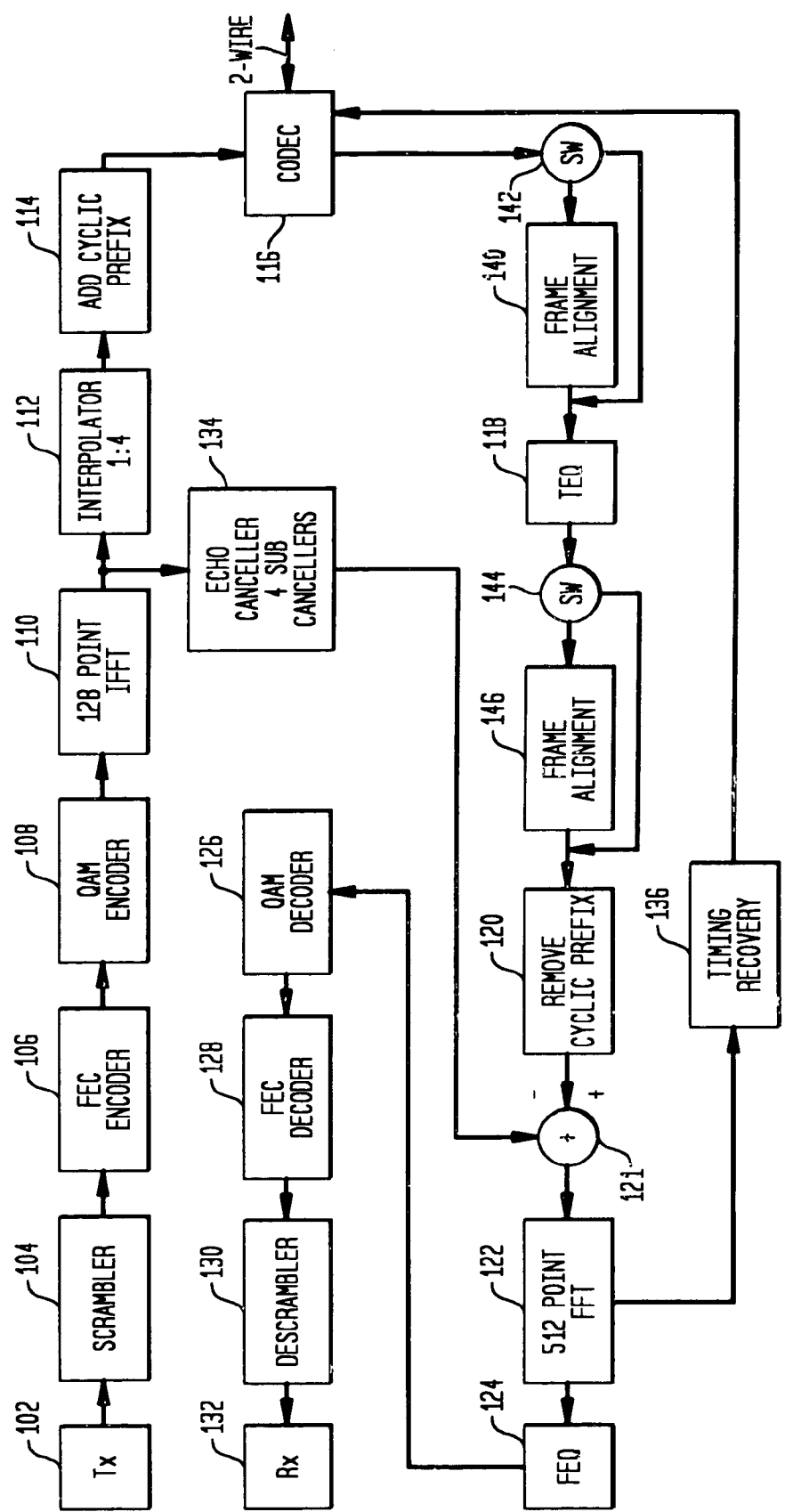
FIG. 3 is a block diagram illustrating the functions of an ADSL modem transceiver for digital multitone communications in accordance with the present invention.

FIG. 3 is a block diagram of a DMT transceiver in accordance with the present invention. Since the present invention pertains to the determination of proper frame alignment during initialization, all of the blocks shown in prior art FIG. 1 remain the same and are shown in FIG. 3 bearing the same reference numerals. The invention resides primarily in frame alignment blocks 140 and 146 and switches 142 and 144. Particularly, the processing described above is performed during initialization on the received data. Switches 142 and 144 are set to cause the received data to bypass blocks 140 and 146 during normal operations.

In operation, block 140 first cross-correlates the received data with a pre-defined periodic transmitted pattern frame signal to find the real channel impulse response without shortening the channel. This process results in a coarse location of the frame alignment position and prepares for TEQ training. TEQ training is then performed. After the completion of TEQ training, the shortening channel impulse response is determined in block 146 in accordance with equation 20 to fine-tune the correct sampling position for final frame alignment.

Figure 4:
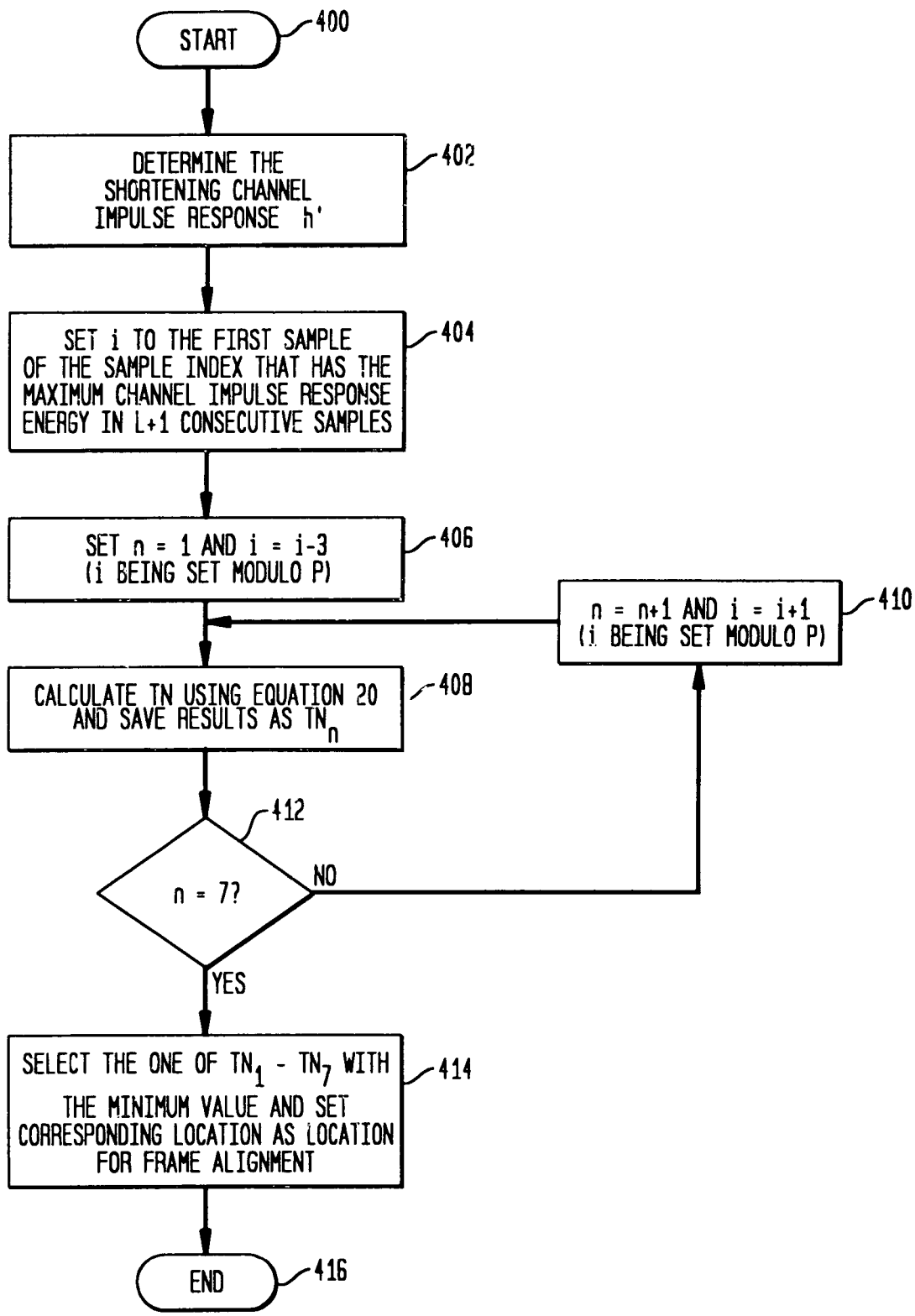
FIG. 4 is a flowchart illustrating symbol alignment in accordance with the present invention.

The process performed in block 146 is illustrated in the flow chart of FIG. 4. The process starts at step 400. In step 402, the shortening channel impulse response h', is determined in accordance with well known mathematical steps. Then, in step 404, the shortened impulse response is queried to find the set of L+1 consecutive samples that has the maximum energy. Variable i is then set to the number of the first sample of that set of samples (i.e., the shortened channel impulse response is rotated to the station for which the first).

In step 406, counter n is set to 1 and i is set to i−3. Note that the value of i must be calculated modulo P, where P is the shortening channel impulse response length, e.g., 512 for heavy ADSL. For example, if, in step 404, i is set to 2, then i−3 is 511 when counting modulo 512. In step 408, equation (20) is used to calculate TN for this particular rotation of the samples. The result is saved as $TN_n$. In the example that is illustrated in FIG. 4, TN will be calculated seven times, namely, for those locations starting at i−3, i−2, i−1, i, i+1, i+2, and i+3. Accordingly, in step 412, it is determined whether TN has been calculated for all seven rotations. If not, flow proceeds to step 410 where both i and n are incremented and flow returns to step 408 where TN is calculated for the next rotation.

When it is determined in step 412 that TN has been calculated for all seven rotations, flow proceeds to step 414. In step 414, the rotation that yielded a minimum value for TN (for the seven rotations tested) is selected as the rotation to be used for frame alignment during normal operation. The process ends at step 416.

It will be understood by those of skill in the art that n can be set to any other reasonable value. It has been found that the best rotation for frame alignment (as determined by equation 20) typically will be within about three samples of the rotation corresponding to the maximal channel impulse response energy in L+1 consecutive coefficients as determined in step 404. Accordingly, n=7 is a reasonable choice. However, it can be any number less than 512. For general application, the weighed vector W in equation 19 can be set to $$[\underbrace{0, \ldots, 0}_{32}, \underbrace{1, \ldots, 1}_{480}].$$

However, it can be set to provide a different value for each tone if desired.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of generating a shortening channel impulse response in a discrete multitone transceiver, said method comprising the steps of:
   (1) determining an impulse response of a channel, said impulse response having a plurality of coefficients corresponding to a length of a symbol;
   (2) rotating said impulse response coefficients to a rotation in which the first L+1 coefficients of said channel impulse response yield a substantially maximal energy, where L is a length of said cyclic prefix; and wherein said rotation decreases inter-symbol interference.

2. A method of generating a shortening channel impulse response in a discrete multitone transceiver, said method comprising the steps of:
   (1) determining an impulse response of a channel, said impulse response having a plurality of coefficients corresponding to a length of a symbol;
   (2) rotating said impulse response coefficients to a rotation that decreases inter-symbol interference; wherein said rotation step comprises rotating said impulse response coefficients to a rotation that starts with coefficient L+1, where L is a length of said cyclic prefix.

3. A method of generating a shortening channel impulse response in a discrete multitone transceiver, said method comprising the steps of:
   (1) determining an impulse response of a channel, said impulse response having a plurality of coefficients corresponding to a length of a symbol;
   (2) rotating said impulse response coefficients to a rotation that decreases inter-symbol interference wherein said rotating step comprises the steps of:
   (2.1) selecting a plurality of rotations of said channel impulse response including and surrounding said rotation that starts with coefficient L+1, where L is a length of said cyclic prefix;
   (2.2) calculating a value for inter-symbol interference based on each of said rotations; and
   (2.3) selecting a one of said rotations of said channel impulse response that yields the lowest inter-symbol interference value.

4. The method of claim 3 wherein step (2.2) is performed in the frequency domain.

5. The method of claim 4 wherein step (2.2) comprises:
   (2.2.1) generating Fourier transforms of said coefficients of said channel impulse response;
   (2.2.2) calculating an average value of a transmitted discrete multitone symbol; and
   (2.2.3) multiplying said Fourier transforms of said coefficients with said average.

6. The method of claim 5 wherein, in step (2.2.1), said Fourier transforms are generated by fast Fourier transform.

7. The method of claim 2 wherein step (2) comprises calculating $$FINTF = \overline{C}(|h'_Y|(FV_1 \cdot W) + |h'_{Y+1}|(FV_2 \cdot W) + \ldots + |h'_{P-1}|(FV_{P-Y} \cdot W))$$

where
$\overline{C}$=an average value of a transmitted discrete multitone symbol,
$h'_i$ represent a series of coefficients in said shortening channel impulse response,
Y=an integer selected based on the number of the next to last coefficient of the series of consecutive coefficients,
P=the number of $h'_i$ coefficients
$V_k$=[1,1, ... ,1,0,0, ... , 0], in which there is a string of k ones and a string of (P–k) zeroes,
W=is a weighting factor vector $[w_0, w_1, w_2 \ldots, w_{P-1}]^T$, and
F represents the process of taking a Fast Fourier Transform.

8. The method of claim 7 wherein $w_0, w_1, \ldots, w_L = 0$ and $w_{L+1}, w_{L+2}, \ldots w_{P-1} = 1$.

9. A method of frame alignment in a discrete multitone transceiver, said method comprising the steps of:
 (1) determining an impulse response of a channel, said impulse response having a plurality of coefficients corresponding to a length of a symbol;
 (2) rotating said impulse response coefficients to a rotation that decreases inter-symbol interference value; and
 (3) using said rotation for frame alignment.

10. The method of claim 9 wherein step (2) comprises rotating said impulse response coefficients to a rotation in which the first L+1 coefficients of said channel impulse response yield a substantially maximal energy, where L is a length of said cyclic prefix.

11. The method of claim 9 wherein step (2) comprises the steps of:
 (2.1) selecting a plurality of rotations of said channel impulse response including and surrounding said a rotation that starts with coefficient L+1, where L is a length of said cyclic prefix;
 (2.2) calculating a value for inter-symbol interference based on each of said rotations; and
 (2.3) selecting a one of said rotations of said channel impulse response that yields the lowest inter-symbol interference value.

12. The method of claim 10 wherein step 2 comprises calculating $$FINTF = \overline{C}(|h'_Y|(FV_1 \cdot W) + |h'_{Y+1}|(FV_2 \cdot W) + \ldots + |h'_{P-1}|(FV_{P-Y} \cdot W))$$

where
$\overline{C}$=an average value of a transmitted discrete multitone symbol,
$h'_i$ represent a series of coefficients in said shortening channel impulse response,
Y=an integer selected based on the number of the next to last coefficient of the series of consecutive coefficients,
P=the number of $h'_i$ coefficients
$V_k$=[1,1, ... ,1,0,0, ... , 0], in which there is a string of k ones and a string of (P–k) zeroes,
W=is a weighting factor vector $[w_0, w_1, w_2 \ldots, w_{P-1}]^T$, and
F represents the process of taking a Fast Fourier Transform.

13. A discrete multitone transceiver comprising:
 a transmitter;
 a receiver;
 a digital processing device adapted to generating a shortening channel impulse response by;
  determining an impulse response of a channel, said impulse response having a plurality of coefficients corresponding to a length of a symbol; and
  rotating said impulse response coefficients to a rotation that decreases inter-symbol interference value; and
 a timing recovery circuit that aligns with a received frame using said rotation.

14. The transceiver of claim 13 wherein said digital processing device is adapted to determine said rotation by rotating said impulse response coefficients to a rotation in which the first L+1 coefficients of said channel impulse response yield a substantially maximal energy.

15. The transceiver of claim 13 wherein said digital processing device is adapted to determine said rotation by rotating said impulse response coefficients to a rotation that starts with coefficient L+1, where L is a length of said cyclic prefix.

16. The transceiver of claim 13 wherein said digital processing device is adapted to determine said rotation by:
 selecting a plurality of rotations of said channel impulse response including and surrounding said a rotation that starts with coefficient L+1, where L is a length of said cyclic prefix;
 calculating a value for inter-symbol interference based on each of said rotations; and
 selecting a one of said rotations of said channel impulse response that yields the lowest inter-symbol interference value.

17. The transceiver of claim 16 wherein said digital processing device performs said calculation by:
 generating Fourier transforms of said coefficients of said shortening channel impulse response;
 calculating an average value of a transmitted discrete multitone symbol; and
 multiplying said Fourier transforms of said coefficients with said average.

18. The transceiver of claim 16 wherein said processor calculates said inter-symbol interference, FINTF, by;

$$FINTF = \overline{C}(|h'_Y|(FV_1 \cdot W) + |h'_{Y+1}|(FV_2 \cdot W) + \ldots + |h'_{P-1}|(FV_{P-Y} \cdot W))$$

where
$\overline{C}$=an average value of a transmitted discrete multitone symbol,
$h'_i$ represent a series of coefficients in said shortening channel impulse response,
Y=an integer selected based on the number of the next to last coefficient of the series of consecutive coefficients,
P=the number of $h'_i$ coefficients
$V_k$=[1,1, ... ,1,0,0, ... , 0], in which there is a string of k ones and a string of (P–k) zeroes,
W=is a weighting factor vector $[w_0, w_1, w_2 \ldots, w_{P-1}]^T$, and
F represents the process of taking a Fast Fourier Transform.

19. A method of frame alignment in a discrete multitone transceiver, said method comprising the steps of:
 (1) determining an impulse response of a channel, said impulse response having a plurality of coefficients corresponding to a length of a symbol;
 (2) determining a set of consecutive samples of said channel impulse response of length L+1, where L is a length of said cyclic prefix, for which the channel impulse response energy is maximal;
 (3) selecting a plurality of rotations of said shortening channel impulse response including and surrounding a rotation that starts with a first coefficient of said consecutive samples determined in step (3);

(4) calculating a value for inter-symbol interference based on each of said rotations; and (5) selecting a one of said rotations selected is step (3) that decreases inter-symbol interference value.

20. The method of claim 19 wherein step (4) comprises:
(4.1) generating fast Fourier transforms of said coefficients of said channel impulse response;
(4.2) calculating an average value of a transmitted discrete multitone symbol; and
(4.3) multiplying said Fourier transforms of said coefficients with said average.

21. The method of claim 19 wherein step (5) comprises calculating $$FINTF = \overline{C}(|h'_Y|(FV_1 \cdot W) + |h'_{Y+1}|(FV_2 \cdot W) + \ldots + |h'_{P-1}|(FV_{P-Y} \cdot W))$$

where $\overline{C}$=an average value of a transmitted discrete multitone symbol, $h'_i$ represent a series of coefficients in said shortening channel impulse response, Y=an integer selected based on the number of the next to last coefficient of the series of consecutive coefficients, P=the number of $h'_i$ coefficients $V_k = [1,1,\ldots,1,0,0,\ldots,0]$, in which there is a string of k ones and a string of (P–k) zeroes, W=is a weighting factor vector $[w_0, w_1, w_2 \ldots, w_{P-1}]^T$, and F represents the process of taking a Fast Fourier Transform.

* * * * *